3,350,325
WATER SOLUBLE POLYMER OF DIGLYCIDYL
ETHER AND AN ALKANOLAMINE
Theodore L. Ashby and Clarence R. Dick, Lake Jackson, Tex., assignors to The Dow Chemical Company, Midland, Mich., a corporation of Delaware
No Drawing. Filed July 31, 1964, Ser. No. 386,732
10 Claims. (Cl. 260—2)

ABSTRACT OF THE DISCLOSURE

This application is concerned with water soluble, thermoplastic polymers resulting from the reaction of approximately equal molecular amounts of diglycidyl ether and an alkanolamine wherein the alkyl portion has from 2 to 4 carbon atoms. The resulting polymer can be represented by the formula

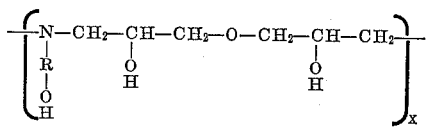

where $x$ may be a whole integer from about 25 to about 300.

---

Diglycidyl ether, i.e. bis(2,3-epoxypropyl)ether, can be reacted with an alkanolamine to obtain a high molecular weight thermoplastic polymer having utility in casting, encapsulating, fiber and film forming. The reaction is illustrated in the following sequence of formulas:

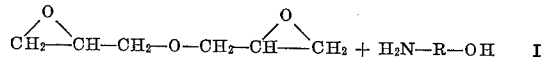   I where R represents a divalent hydrocarbon radical containing from two to four carbon atoms. The polymer product can be represented as follows:

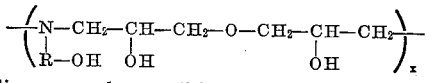   II

Depending upon the conditions under which the polymer is prepared, the value of $x$ in Formula II may be an integer from about 25 to about 300.

Alkanolamines which can be used in the preparation of these polymers as indicated in Formula I may be the hydroxyl amines which contain at least two amino hydrogen atoms, i.e. a primary amine, and a divalent hydrocarbon group containing from two to four carbon atoms. Suitable hydroxyl amines are monoethanolamine, monopropanolamine and monobutanolamine.

A method whereby these thermoplastic polymers can be produced is illustrated in the following examples.

Example 1

122.2 parts by weight of monoethanolamine were charged to a reaction vessel equipped with a stirrer and means for temperature control. The temperature in the reactor was then raised to 78° C. 260.3 parts by weight of diglycidyl ether in solution with 127 parts by weight of the dimethyl ether of triethylene glycol were added to the reactor over a period of one hour and 55 minutes. The temperature rose to about 135° C. during this addition, then lined out when all of the diglycidyl ether solution had been added. The mixture was digested for 65 minutes at 122° C. Upon cooling, the product settled to the bottom of the reaction vessel as a brown liquid. After removing the solvent, the water soluble, thermoplastic polymer could be successively heated and cooled without undergoing a permanent change in its rheological properties and, while in the molten state, it could be poured, cast and drawn into fibers.

Example 2

The reactor was charged with 122.2 parts by weight of monoethanolamine and the temperature raised to 78° C. A solution containing 260.3 parts of diglycidyl ether in 189.2 parts of dimethyl formamide was added to the reactor over a period of 62 minutes. The temperature rose to 107° C. during this addition and exhibited a maximum exotherm at 160° C. The reaction mixture was digested at 140° C. for about 23 hours then cooled and reworked by rotary evaporation at about 90° C. under an absolute pressure of 2.5 inches of mercury. The product was a dark brown, very viscous product which calculations indicated to contain 40 parts by weight of solvent. By heating under vacuum a brown, water soluble product was obtained which could be melted then cast, drawn into fibers or cast into a film.

Example 3

The reaction was carried out without using a solvent in the reaction mixture. The reactor was charged with 122.2 parts of monoethanolamine then the slow addition of 260.3 parts of diglycidyl ether was begun while controlling the temperature at 80° C. The reaction mixture became very viscous when about ⅔ of the diglycidyl ether had been added, therefore the remaining ⅓ was added rapidly. The mixture was reacted at these conditions for a total time of 3 hours and 30 minutes then digested at 80° C. for 18 hours and 40 minutes. The product was a yellow, water soluble, thermoplastic product which was free of epoxy groups.

Example 4

This example illustrates the use of water as a solvent in the reaction mixture. The reactor was charged with 122.2 parts of monoethanolamine and 95.6 parts of water. 260.3 parts of diglycidyl ether were added over a period of 74 minutes while maintaining the temperature at about 30° C. The product mixture was digested for 2 hours at 38° C. then 287.3 parts of water were added, producing a solution containing 50 percent solids. This solution was digested for 9 hours at 35° C. The final product was a pale yellow viscous liquid. Upon removal of water the polymer could be melted and cast into films and sheets or it could be drawn into fibers. A one percent solution of the polymer in water at 100° F. had a viscosity of 0.865 centistoke.

It is preferred to use an equimolar ratio of the diglycidyl ether and the alkanolamine. If less diglycidyl ether is used, the molecular weight of the polymer is lowered owing to polymer chain termination by the amine. If there is excess diglycidyl ether, it undergoes homopolymerization, resulting in a different type of product. For this reason, the diglycidyl ether should be added to the alkanolamine at a rate approximately equal to the reaction rate so that the concentration of monomeric ether is never great enough to result in a significant amount of homopolymerization.

The polymerization can be conducted at a temperature in the range from about 25° to about 175° C., however, polymerization in the range from 70° to 90° C. is preferred in the presence of an organic solvent. When no solvent is employed, the range from 110° to 130° C. is preferred. In the presence of water, a temperature between 25° and 50° C. is preferred.

In general, any of the polar organic solvents such as alcohols, glycols and ketones are suitable for the polymerization reaction.

The digestion of the reaction mixture following the initial reaction as the diglycidyl ether is added to the alkanolamine enables the growth of higher molecular weight polymers. The digestion can be performed at a temperature in the same range as the initial reaction, viz. from 25° to 175° C. The length of time necessary for this portion of the reaction will vary with the temperature and solvent system as it does in the initial reaction. When the reaction is completed, the mixture will contain substantially no epoxide groups.

We claim:
1. A method of producing a water soluble thermoplastic polymer comprising the reaction product of approximately equal molecular quantities of diglycidyl ether and an alkanolamine containing from 2 to 4 carbon atoms, said method comprising:
adding said diglycidyl ether to said alkanolamine while mixing and maintaining the reaction temperature of said amine and ether mixture between about 25° and 175° C., the rate of addition being approximately equal to the rate of reaction between said amine and ether; thereafter
completing the reaction of said mixture by maintaining said reaction temperature until all of the epoxide groups in said mixture have been reacted.
2. The method according to claim 1 wherein said reaction is conducted at a reaction temperature in the range from 70° to 90° C.
3. The method according to claim 1 wherein said reaction temperature is maintained between 110° and 130° C.
4. The method according to claim 1 wherein said reaction is conducted in the presence of a polar solvent.
5. The method according to claim 4 wherein said solvent is water.
6. The method according to claim 4 wherein said solvent is the dimethyl ether of triethylene glycol.
7. The method according to claim 4 wherein said solvent is dimethyl formamide.
8. The method according to claim 5 wherein said reaction is conducted at a temperature in the range from 25° to 50° C.
9. A water soluble thermoplastic polymer having the general formula

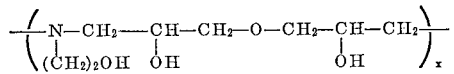

wherein $x$ is an integer from about 25 to about 300.

10. A water soluble thermoplastic polymer having the general formula

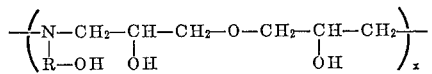

wherein $x$ is an integer from about 25 to about 300 and where R is a divalent hydrocarbon radical containing from two to four carbon atoms.

No references cited.

WILLIAM H. SHORT, *Primary Examiner.*

T. PERTILLA, *Assistant Examiner.*